US 9,443,495 B2

(12) United States Patent
Newton et al.

(10) Patent No.: US 9,443,495 B2
(45) Date of Patent: Sep. 13, 2016

(54) GRAPHICS PROCESSING FOR HIGH DYNAMIC RANGE VIDEO

(75) Inventors: Philip Steven Newton, Eindhoven (NL); Wiebe De Haan, Eindhoven (NL); Charles Leonardus Cornelius Maria Knibbeler, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 56 days.

(21) Appl. No.: 14/125,319

(22) PCT Filed: Jun. 7, 2012

(86) PCT No.: PCT/IB2012/052873
§ 371 (c)(1),
(2), (4) Date: Dec. 11, 2013

(87) PCT Pub. No.: WO2012/172460
PCT Pub. Date: Dec. 20, 2012

(65) Prior Publication Data
US 2014/0125696 A1 May 8, 2014

(30) Foreign Application Priority Data
Jun. 14, 2011 (EP) .................... 11169746

(51) Int. Cl.
*G09G 5/00* (2006.01)
*G09G 5/377* (2006.01)
(Continued)

(52) U.S. Cl.
CPC ............. *G09G 5/377* (2013.01); *H04N 5/235* (2013.01); *H04N 5/4403* (2013.01); *H04N 5/445* (2013.01);
(Continued)

(58) Field of Classification Search
CPC .... G09G 5/377; H04N 5/235; H04N 5/4403; H04N 5/445; H04N 21/42653; H04N 21/4325; H04N 21/4854
See application file for complete search history.

(56) References Cited

U.S. PATENT DOCUMENTS 7,664,370 B2  2/2010  McCrossan
7,986,375 B2  7/2011  Krijn
(Continued)

FOREIGN PATENT DOCUMENTS

EP        0465102 A2   1/1992
EP       2007216021   8/2007
EP        2144444 A1   1/2010

OTHER PUBLICATIONS

"White Paper Blu-ray Disc (TM) Format", Blue Ray Disc, 2.B Audio Visual Application Format Specifications for BD-ROM Version 2.4, May 2010.

*Primary Examiner* — Barry Drennan
*Assistant Examiner* — Robert Craddock
(74) *Attorney, Agent, or Firm* — Larry Liberchuk

(57) ABSTRACT

A device for processing video information has an input unit (112) for receiving the video information having low dynamic range [LDR] video data and/or high dynamic range [HDR] video data, and a video processor (113) for generating a display signal for display in a LDR display mode or HDR display mode. Graphics data is processed for generating an overlay for overlaying the video data. The input unit receives graphics processing control data comprised in the video information, the graphics processing control data including at least one HDR processing instruction for overlaying the graphics data in the HDR display mode. The video processor is constituted for adapting the processing when overlaying the graphics data in dependence on the specific display mode and the HDR processing instruction. Advantageously the source of the video information is enabled to control the processing of graphics in HDR display mode via the HDR processing instruction.

14 Claims, 7 Drawing Sheets

(51) Int. Cl.
  *H04N 5/235* (2006.01)
  *H04N 5/44* (2011.01)
  *H04N 5/445* (2011.01)
  *H04N 21/432* (2011.01)
  *H04N 21/4363* (2011.01)
  *H04N 21/485* (2011.01)
  *H04N 21/488* (2011.01)
  *H04N 21/426* (2011.01)

(52) U.S. Cl.
  CPC .... *H04N 21/42653* (2013.01); *H04N 21/4325* (2013.01); *H04N 21/43635* (2013.01); *H04N 21/488* (2013.01); *H04N 21/4854* (2013.01); *H04N 21/42646* (2013.01)

(56) References Cited

U.S. PATENT DOCUMENTS

| | | |
|---|---|---|
| 2004/0067041 A1 | 4/2004 | Seo |
| 2006/0104533 A1 | 5/2006 | Daly |
| 2006/0170662 A1* | 8/2006 | Kurane ............. 345/204 |
| 2009/0103895 A1 | 4/2009 | Yahata |
| 2012/0019722 A1* | 1/2012 | Kwisthout et al. ......... 348/564 |

* cited by examiner

| Value | Segment |
|---|---|
| 0x00 - 0x13 | reserved |
| 0x14 | Palette definition segment |
| 0x15 | Object definition segment |
| 0x16 | Presentation composition segment |
| 0x17 | Window definition segment |
| 0x18 | Interactive composition segment |
| 0x19 - 0x7F | reserved |
| 0x80 | End of display set segment |
| 0x81 - 0x82 | Used by HDMV text subtitle streams |
| 0x83 | HDR processing definition segment ~41 |
| 0x84 - 0xFF | reserved |

| Syntax | Bits | Mnem |
|---|---|---|
| HDR_processing_definition segment () { | | |
|     Segment_descriptor() | 8 | uimsbf |
|     Pup-up_process_descriptor | 8 | uimsbf |
|     Subtitle_process_descriptor | 8 | uimsbf |
|     Number_of_HDR_palettes | 8 | uimsbf |
|     for (i=0; i<Number_of_HDR_Palettes; i++) { | | |
|         palette_id | 8 | uimsbf |
|         palette_version_number | 8 | uimsbf |
|         Number_of_entries | 8 | uimsbf |
|         for (i=0; i<Number_of_entries; i++) { | | |
|         Palette_entry(){ | | |
|             Palette_entry_id | 8 | uimsbf |
|             Y_value | 12 | uimsbf |
|             Cr_value | 12 | uimsbf |
|             Cb_value | 12 | uimsbf |
|             T_value | 12 | uimsbf |
|         } | | |
|     } | | |
| } | | |

FIG. 5

| Value | Graphics processing instructions for HDR Video |
|---|---|
| 0x00 | No special processing |
| 0x01 | Reduce transparency to 10% of LDR value |
| 0x02 | Reduce transparency to 20% of LDR value |
| 0x03 | Reduce transparency to 30% of LDR value |
| 0x04 | Reduce transparency to 40% of LDR value |
| 0x05 | Reduce transparency to 50% of LDR value |
| 0x06 | Reduce transparency to 60% of LDR value |
| 0x07 | Reduce transparency to 70% of LDR value |
| 0x08 | Reduce transparency to 80% of LDR value |
| 0x09 | Reduce transparency to 90% of LDR value |
| 0x0A | Switch to LDR when pop_up graphics is activated; Switch back to HDR when pop_up graphics is de-activated |
| 0x0B | Use HDR palettes |
| 0x0C-0xFF | reserved |

FIG. 6

| Value | Graphics processing instructions for HDR Video |
|---|---|
| 0x00 | No special processing |
| 0x01 | Reduce luma to 10% of LDR value |
| 0x02 | Reduce luma to 20% of LDR value |
| 0x03 | Reduce luma to 30% of LDR value |
| 0x04 | Reduce luma to 40% of LDR value |
| 0x05 | Reduce luma to 50% of LDR value |
| 0x06 | Reduce luma to 60% of LDR value |
| 0x07 | Reduce luma to 70% of LDR value |
| 0x08 | Reduce luma to 80% of LDR value |
| 0x09 | Reduce luma to 90% of LDR value |
| 0x0A | Use HDR palettes |
| 0x0B-0xFF | reserved |

FIG. 7

| Value | Graphics processing instructions for display_mode HDR |
|---|---|
| 0x00 | No special processing |
| 0x01 | Reduce transparency to 10% of LDR value |
| 0x02 | Reduce transparency to 20% of LDR value |
| 0x03 | Reduce transparency to 30% of LDR value |
| 0x04 | Reduce transparency to 40% of LDR value |
| 0x05 | Reduce transparency to 50% of LDR value |
| 0x06 | Reduce transparency to 60% of LDR value |
| 0x07 | Reduce transparency to 70% of LDR value |
| 0x08 | Reduce transparency to 80% of LDR value |
| 0x09 | Reduce transparency to 90% of LDR value |
| 0x0A | Use HDR palettes |
| | |
| 0x0B-0xFF | reserved |

GRAPHICS PROCESSING FOR HIGH DYNAMIC RANGE VIDEO

FIELD OF THE INVENTION

The invention relates to a device for processing video information, the device comprising an input unit for receiving the video information, the video information comprising low dynamic range [LDR] video data and/or high dynamic range [HDR] video data, and a video processor for generating a display signal by processing the video data for display in a specific display mode being any one of a LDR display mode and a HDR display mode, and processing graphics data for generating an overlay for overlaying the video data.

The invention further relates to a video signal for transferring video information, and a device for generating video information, a method for processing video information and a method for generating video information.

The invention relates to the field of displaying video information on a high dynamic range [HDR] display. Display units are currently being developed that are able to provide a high brightness level and a very high contrast between dark parts of the image and bright parts of the image. For fully exploiting the capabilities of such displays video information may be enhanced by providing adapted video information, e.g. having a higher resolution taking into account the higher brightness and the HDR contrast range. For distinguishing from HDR, the traditional video information is called low dynamic range [LDR] video in this document. As such, LDR video information may be displayed on a HDR display unit in HDR display mode for improved contrast. However, a more compelling image is achieved when the video information itself is generated in a HDR video format, e.g. exploiting the enhanced resolution for better visual effects or for improving visibility in bright or dark areas while avoiding visual banding by using slightly different colors. In addition to enhancing the precision of the image data, movie directors can locally enhance the experience, by e.g. emphasizing explosions, and/or improve visibility in bright or dark scenes/areas. Graphical data, such as pop-up menus or subtitles, may be included in video information for overlaying.

The video processing device may be a Blu-ray Disc player and may be coupled to a display device like a HDR enabled TV set or monitor via a suitable interface, preferably a high-speed digital interface like HDMI. The HDR display may also be integrated with the video processing device.

BACKGROUND OF THE INVENTION

The document US2004/0067041 describes a recording medium having a data structure for managing reproduction of graphic data and recording and reproducing methods and apparatuses. The recording medium includes a graphic information area having at least one graphic image information segment and at least one palette information segment recorded therein. Each palette information segment provides color information. Each graphic image information segment provides reproduction information for reproducing one or more graphic images. Multiple color palettes are proposed, each palette corresponding to a different color depth of the main video that is between 8 bits and 24 bits.

SUMMARY OF THE INVENTION

The proposed data structure for graphical data in US2004/0067041 enables one of different color palettes to be used, the different palettes corresponding to different resolutions of the graphical data. Different graphical images may be simultaneously overlaid on main video, the different graphical images having different sizes and color depths. However, such a video information format may result in difficulties or additional cost at the receiver. For example, a respective palette must be included for displaying graphical images at a specific color depth. The actual color depth may be determined in a reproducing device depending on the degree of importance and size of the graphical image.

The known graphical data structure has the problem that, when a preferred display mode in a reproducing device varies, the different palettes and sizes of the graphical data structure result in a predefined and fixed generation of an overlay based on the graphical images using the predefined palettes.

It is an object of the invention to provide a system for displaying video information where generating the overlay is adaptable to a preferred display mode.

For this purpose, according to a first aspect of the invention, in the device for processing video information as described in the opening paragraph, the input unit is constituted for receiving graphics processing control data comprised in the video information, the graphics processing control data including at least one HDR processing instruction for overlaying the graphics data in the HDR display mode, and the video processor is constituted for adapting the processing when overlaying the graphics data in dependence on the specific display mode and the HDR processing instruction. When HDR video or images is encoded, that can be done in different ways. E.g., one may use a 12 or 16 bit word for the luma of the pixel colors, and use a faint non-linearity for encoding the wide range of luminances in a scene. One may also encode with a strong non-linearity the HDR scene in an 8 bit word, which is then also relatively suited for immediate display on an LDR display too, but also convertible to what driving signal is optimal for rendering the full HDR content of the scene on any HDR display (e.g. 2000 or 15000 nit peak brightness). Now any graphics like subtitles may be encoded in such a way that if one were to immediately without further optimizing use a graphics pixel code (e.g. some value which is "graphics white"), then depending on the actual display at the rendering, and viewing environment etc., but potentially also on a class of the graphics like e.g. its size or position on the screen, that white may be perceived as being e.g. too bright or too dim. With the proposed HDR processing instructions, one may optimally tune graphics (which usually are perceived as LDR, but in the end are also HDR, at least when coordinated by showing together on an HDR picture), whether it has to be upwards for some configurations like the display used for rendering, or downwards for other configurations, and in whichever of the different ways the (HDR) image(s) and graphics are encoded. Control information allows the receiving display to be steered as one of the types foreseen by the creation side, or to determine by itself which of the offered co-rendering options of the video/image and graphics is optimal.

According to a further aspect of the invention, the video signal is for transferring video information to the video processing device, the video information comprising low dynamic range [LDR] video data and/or high dynamic range [HDR] video data, the video signal comprising graphics processing control data comprised in the video information, the graphics processing control data including at least one HDR processing instruction for overlaying the graphics data in the HDR display mode for adapting the processing when overlaying the graphics data in dependence on the specific display mode and the HDR processing instruction.

According to a further aspect of the invention an optical record carrier comprises a track of optically readable marks, wherein the marks represent the above video signal.

According to a further aspect of the invention a device for generating video information comprises an output unit for transferring video information to a video processing device, the video information comprising low dynamic range [LDR] video data and/or high dynamic range [HDR] video data, the video processing device being arranged for generating a display signal by processing the video data for display in a specific display mode being any one of a LDR display mode and a HDR display mode, and processing graphics data for generating an overlay for overlaying the video data, and a video processor for generating the video information including graphics processing control data, the graphics processing control data including at least one HDR processing instruction for overlaying the graphics data in the HDR display mode for, in the video processing device, adapting the processing when overlaying the graphics data in dependence on the specific display mode and the HDR processing instruction.

According to a further aspect of the invention a method of processing the video information comprises processing the video data for display in a specific display mode being any one of a LDR display mode and a HDR display mode, and processing graphics data for generating an overlay for overlaying the video data, and receiving graphics processing control data comprised in the video information, the graphics processing control data including at least one HDR processing instruction for overlaying the graphics data in the HDR display mode, and adapting the processing when overlaying the graphics data in dependence on the specific display mode and the HDR processing instruction.

According to a further aspect of the invention a method of generating the video information comprises generating graphics processing control data, the graphics processing control data including at least one HDR processing instruction for overlaying the graphics data in the HDR display mode for, in the video processing device, adapting the processing when overlaying the graphics data in dependence on the specific display mode and the HDR processing instruction, and including the graphics processing control data in the video information.

Also, a computer program product for processing video information is operative to cause a processor to perform the methods as defined above.

The graphics processing control data comprises HDR processing instructions for overlaying the graphics data, such as graphical commands or settings to be applied for adapting the processing in HDR mode for generating the overlay or for adapting the processing of the main video. In particular, the graphical instructions define the processing to be applied when the specific display is the HDR display mode. The video processor is arranged for adapting the processing of the graphics data and/or the video data when overlaying the graphics data.

The measures have the effect that the adapting of the processing of the graphics data and/or the video data is controlled depending on the specific display mode as determined in the video processing device according to said respective HDR processing instruction included in the graphics processing control data. Hence the graphics processing control data defines and controls the actual processing operations performed in a reproducing device, because the respective HDR processing instruction is provided at the source of the video information. Advantageously the author of the video information is enabled to control the displaying of the graphics data when a display is generated in HDR display mode. For example, the effort of making separate graphic assets for displaying video in either LDR mode or HDR mode may be avoided, because a single set of graphic assets can be used by suitably adapting the processing at the receiving side under the control of the authoring side.

The invention is also based on the following recognition. While extending the existing video systems for HDR the high contrast ratio available in advanced display devices is used to achieve vivid and realistic video images. However, the inventors have seen that, when overlaying graphics in such a HDR display mode, several problems may occur. For example, a problem that can occur with (semi-transparent) graphics overlays on top of HDR video is that some scenes in HDR video can be exceptionally bright. This will significantly reduce the legibility of the graphics such as subtitles or menu's shown at the same time. Another problem that can occur is that the characters in the subtitles might become so bright that it becomes annoying or fatiguing for the reader. Also extreme bright subtitles or menus may cause halo effects or glare and thus degrade the perceived quality of the video. The inventors have addressed such problems by providing said HDR processing instructions in the video information, which can be handled by novel video processing devices, which process the incoming video by decoding the main video and then overlay the graphics data as instructed by said HDR processing instructions.

Optionally the video information comprises segments defining parameters for generating the overlay, the segments having respective segment types, the segments comprising a HDR processing definition segment of a HDR processing definition type for constituting the graphics processing control data, and the video processor is arranged for adapting the processing according to the HDR processing instruction from the HDR processing definition segment. Advantageously the format of the video information is extended using segments that define video parameters, which segments may also be used for other decoding information.

Optionally, the graphics data comprises LDR palette information defining at least one LDR color palette and HDR palette information defining at least one HDR color palette and the graphics processing control data comprises a palette selection instruction for selecting the HDR palette, and the video processor is arranged for selecting the HDR color palette in the HDR display mode in dependence on the palette selection instruction. The video data comprises both an LDR color palette and a HDR color palette, and the palette selection instruction enable selecting a respective palette in the HDR display mode.

Optionally, the graphics processing control data comprises a transparency instruction defining a reduction of transparency with respect to the transparency in LDR display mode, and the video processor is arranged for adapting transparency of the graphics data in the overlay in the HDR display mode in dependence on the transparency instruction. Advantageously, the transparency of the graphics data may be adjusted to the respective HDR video scene.

Optionally, the graphics processing control data comprises a video switch instruction defining whether to switch the processing of the video data to LDR display mode while the specific display mode is the HDR display mode, and the video processor is arranged for switching the video data to LDR display mode while overlaying the video data when the specific display mode is the HDR display mode in dependence on the video switch instruction, or the graphics processing control data comprises a graphics selection instruction defining whether to retrieve a stream of HDR graphics data while the specific display mode is the HDR display mode, and the video processor is arranged for using the HDR graphics data while overlaying the video data when the specific display mode is the HDR display mode in dependence on the graphics selection instruction. Advantageously, the video display may be temporarily switched to LDR mode while overlaying the graphics data, or the graphics processing may be set to use a dedicated HDR graphics stream.

Optionally, the graphics processing control data comprises a luminance instruction defining a reduction of luminance with respect to the luminance in LDR display mode, and the video processor is arranged for defining luminance of the graphics data in the overlay in the HDR display mode in dependence on the luminance instruction. Advantageously, the luminance of the graphics data may be adjusted to be convenient when displayed in HDR display mode.

Optionally, the graphics processing control data comprises a pop-up process descriptor defining a HDR processing instruction when overlaying pop-up graphic data in the HDR display mode. Advantageously, the processing is adapted when the device is activated to display a pop-up, e.g. a menu or button, according to the respective HDR processing instruction.

Optionally, the graphics processing control data comprises a subtitle process descriptor defining a HDR processing instruction when overlaying subtitle graphic data in the HDR display mode. Advantageously, the processing is adapted when the device is activated to display a subtitle, according to the respective HDR processing instruction. Hence specific processing is active when displaying subtitles in HDR mode.

Optionally, the video processor is arranged for setting the specific display mode in dependence of display capability information acquired from a display device connected to receive the display signal.

Optionally, the video processor is arranged for setting the specific display mode in dependence of display mode information received from a display device connected to receive the display signal. Advantageously, the processing may be adapted automatically to the respective display mode.

Optionally, the video processor is arranged for setting the specific display mode in dependence of dynamic range information included in the video information, indicative of a dynamic range of the video information. Advantageously, the processing may be adapted automatically to the received video information.

Optionally, the video processor is arranged for setting the specific display mode in dependence of a display mode preference based on a user setting. Advantageously, the processing may be adapted to the respective display mode according to the user setting.

The above options may be suitably combined for constituting further preferred embodiments of devices and methods according to the invention. Further embodiments are given in the appended claims, disclosure of which is incorporated herein by reference. Features defined above or in dependent claims for a particular method or device correspondingly apply to other devices or methods.

BRIEF DESCRIPTION OF THE DRAWINGS

These and other aspects of the invention will be apparent from and elucidated further with reference to the embodiments described by way of example in the following description and with reference to the accompanying drawings, in which FIG. 5 shows graphics processing control data, FIG. 6 shows HDR graphics processing instructions for pop-up graphics, FIG. 7 shows HDR graphics processing instructions for subtitle graphics, FIG. 8 shows HDR graphics processing instructions for an input stream of video information with only LDR video data.

The figures are purely diagrammatic and not drawn to scale. In the Figures, elements which correspond to elements already described have the same reference numerals.

DETAILED DESCRIPTION OF EMBODIMENTS

Figure 1:
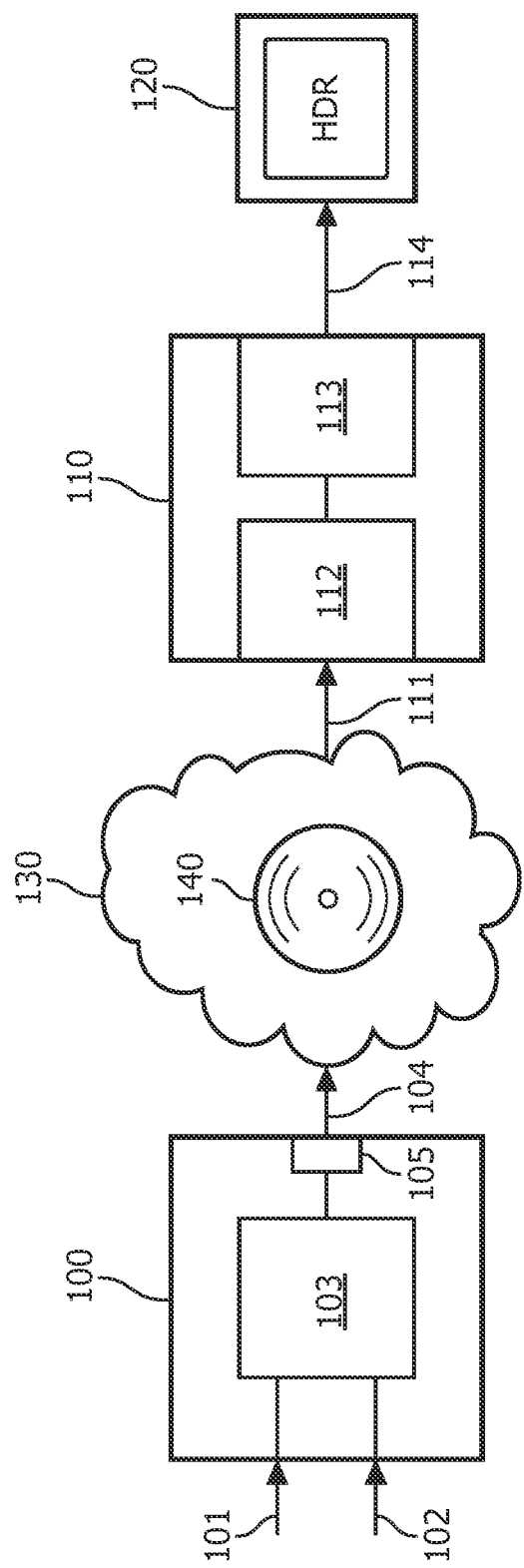
FIG. 1 shows a system for transferring video information.

High Dynamic Range (HDR) displays can provide a much higher light output and contrast between black and white than regular displays. Such displays may have a matrix of high efficiency LED's in the backlight that provide the display with a dynamic range of 40.000:1 and more. Such a large dynamic range in combination with a high (local) light output greatly increases the realism of the images shown on the display. To make full use of the large dynamic range and high brightness of these displays, the content must also support enough fidelity and resolution in luminance and color.

Distribution of audio video (A/V) content is described in several standards, such as for example DVB for broadcasting and Blu-ray Disc or DVD for packaged media. The digital video content transmitted using these standards is sampled as YUV 4:2:0 or better YUV 4:2:2 and encoded using standards from the MPEG group. After transmission the content is decoded and played back on a device that implements the related standards such as a Blu-ray Disc player. The decoded content is then transmitted to a display using a suitable interface. Video encoded according to the traditional standards is called low dynamic range (LDR) video in this document. The standards may be extended to support HDR video.

The Blu-ray Disc (BD) standard supports graphics overlays for subtitles, full screen menus, animations and pop-up graphics. Also, BD players typically feature On Screen Display (OSD) menus. Hence graphics information may also be generated locally. Several issues are addressed related to overlay of graphics on top of video background on a HDR display. For example a problem that can occur is that the characters in the subtitles might become so bright that it becomes annoying or fatiguing for the reader. Another problem that can occur with (semi-transparent) graphics overlays on top of HDR video is that some scenes in HDR video can be exceptionally bright. This will significantly reduce the legibility of the graphics such as subtitles or menus shown at the same time. It is described to adjust the processing of graphics like subtitles or pop-up menus depending on the type of video being displayed (LDR or HDR video). Also in the case that the data stream contains only one type of video (LDR or HDR), problems can occur when displaying this video in combination with graphics on a HDR display. Hence the solutions proposed are relevant for video information containing LDR, HDR or both LDR and HDR video data.

Summarized various issues are addressed by the proposed system, such as:
- ensuring that a HDR enabled disc plays correctly on a legacy player;
- semi-transparent overlays of graphics and exceptionally bright areas of the video background can make the graphics, such as subtitles or menu's unreadable;
- subtitles can become annoying or fatiguing because of extreme brightness;
- extreme bright subtitles or pop-up menus can have a negative effect on the perceived quality of the video. This can be caused by a halo effect or by glare;
- the required graphics processing in case of displaying on a HDR display may differ for different types of graphics content, for example menus and subtitles.

FIG. 1 shows a system for transferring video information. The system has a video source 100, which provides a video transfer signal 104 to be transferred to a video processing device 110 via a transfer medium 130, e.g. an optical disc 140, the internet or a broadcast network. The processing device constitutes a receiver, which receives a video signal 111 from the recording medium or broadcast in an input unit 112. The receiver provides a display signal 114 to a HDR display device 120, for example a HDMI signal to TV or projection system capable of displaying video in a high dynamic range (HDR) display mode. Alternatively the receiver may be connected to an LDR display device (not shown) and may then generate an LDR display signal. The receiver may be a separate device like a Blu-ray Disc (BD) player, or a set top box (STB) or satellite receiver. Alternatively, the receiver 110 and the HDR display 120 are combined in a single device, like a digital HDR TV having a digital tuner and a video processor build in.

The system is arranged for transferring the video information in multiple data streams multiplexed in a video transfer signal, e.g. according to a video format known as such. The video information includes low dynamic range [LDR] video data and/or high dynamic range [HDR] video data, and may also include graphics data, like subtitles or menus. The HDR video data is provided on main input 101 of video source device 100. The graphics data may be provided on auxiliary input 102 of video source 100, and is arranged for display in an overlay on the main video data, such as subtitles. It is noted that multiple streams of graphic data may be included. Further graphics data like pop-up menus may be encoded in a separate graphics stream, usually separately transferred outside the multiplexed real-time video data streams (so-called out-of-mux), to enable preloading and activating at any time. Also, additional graphic data may be generated downstream, e.g. menus generated at the receiving side in the receiver 110.

The system, at the source side, accommodates the functions for including, in the video transfer signal, graphic processing control data as described below. The graphics processing control data includes at least one HDR processing instruction for overlaying the graphics data in the HDR display mode. The functions may be implemented in a video processor 103 in the source device, but may also be performed in an authoring system based on dedicated computer programs, in a broadcasting studio, etc.

The main video is processed by arranging the HDR video data according to a video transmission format. According to the applicable transmission standard, the system provides control data for indicating parameters to a receiver for enabling the receiver to reproduce the main video data and overlaying the graphics data. Finally a data transport stream in the video transfer signal 104 is assembled as described above, including the graphic processing control data as described in detail below, for transmission via the transfer medium 130.

The video transfer signal 104 for transferring the HDR video information and the graphic processing control data is transferred via the transfer medium 130, e.g. an optical disc 140 like BD, a public TV transmission network, a satellite network, internet, etc. In the video signal a transport stream represents the HDR video information. A video information transfer platform is Digital Video Broadcast (DVB). DVB applies various standards for terrestrial, cable, satellite and mobile for transport and associated signaling of audio/video, graphics (subtitles etc) and interactive applications (Java applications or HTML/XML). Current advances in display technology are making it possible to introduce HDR video for a mass market audience. Therefore to enable widespread distribution of HDR content the DVB standards may be extended to allow broadcast of HDR content. Further transfer media include the BD optical disc, the internet, etc, and the respective video formats may also be adapted for HDR video. In particular, such video formats may be enhanced by defining the video transfer signal to include the proposed graphic processing control data. It is noted that the video information may be further arranged for displaying three dimensional (3D) video data, optionally in combination with the HDR enhanced video information.

The receiver 110 has the input unit 112 for receiving the video signal 111, i.e. the video transfer signal 104 after transferring via the transfer medium 130 as described above. The video information and the graphic processing control data are retrieved and coupled to a video processor 113. The video processor has a signal processing structure for generating a display signal 114 by processing the video data for display in a specific display mode being any one of a LDR display mode and a HDR display mode, and processing graphics data for generating an overlay for overlaying the video data. The video processor adapts the processing when overlaying the graphics data in dependence on the specific display mode and the HDR processing instruction, as elucidated below in detail.

The source device 100 is for generating video information, and the device has an output unit 105 for transferring video information to the video processing device 110. The source device has a video processor 103 for generating the video information including the graphics processing control data, the graphics processing control data including at least one HDR processing instruction for overlaying the graphics data in the HDR display mode for, in the video processing device, adapting the processing when overlaying the graphics data in dependence on the specific display mode and the HDR processing instruction.

The video signal 111 is for transferring video information to a video processing device, the video processing device being arranged for generating a display signal by processing the video data for display in a specific display mode being any one of a LDR display mode and a HDR display mode, and processing graphics data for generating an overlay for overlaying the video data. The video signal includes the graphics processing control data in the video information. The graphics processing control data has at least one HDR processing instruction for overlaying the graphics data in the HDR display mode for adapting the processing when overlaying the graphics data in dependence on the specific display mode and the HDR processing instruction.

In an embodiment, the video signal is provided on an optical record carrier 140, for example a DVD or BD. The optical record carrier has a track of optically readable marks, wherein the marks represent the video signal as described above. A practical example of the specific video format used to store the video information including the graphic processing control data based on BD is described below.

Figure 2:
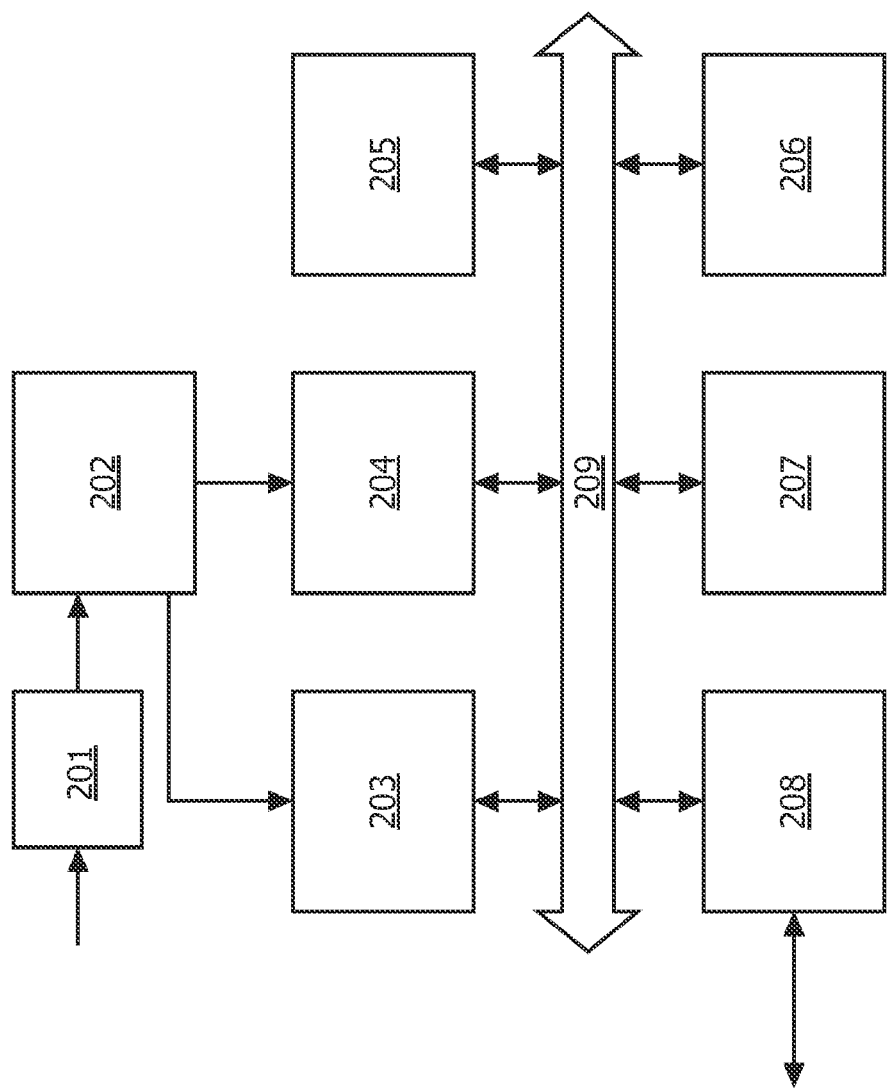
FIG. 2 shows a video processing system in a receiving device.

FIG. 2 shows a video processing system in a receiving device. The device may for example be a BD player, digital TV set or a set top box. An input unit 201 comprises a demodulator for retrieving the video information from the video signal. The input unit may also include an optical record carrier unit for retrieving the video information from an optical record carrier. The demodulator retrieves the transport stream from the video signal, which transport stream is coupled to a de-multiplexer unit 202, which also may include a descrambler, for retrieving the various data streams and control data from the transport stream. The data streams are coupled to a main decoder 203 for decoding the video and audio data, and to an auxiliary decoder 204 for decoding graphics data and control data. The decoders and further elements are coupled via a system bus 209 to a central processing unit (CPU), a graphics processor 206, a memory 207, and an output stage 208 for generating the display signal, for example according to HDMI.

In some implementations the processing pipeline of video and subtitles are different and separate. Processing and high bandwidth operations such as A/V decoding and graphics processing (filter operations etc.) is done in a dedicated ASIC whilst processing of low bandwidth information such as the subtitles is done by a low power general purpose processer. The subtitles and the video are not combined until at the very end of the processing pipeline.

In the following the video information is discussed according to the Blu-ray disc format. It is to be noted that the BD format is a practical example, and that similar graphic processing control data may be included in any other suitable video format.

Figures 3, 4:
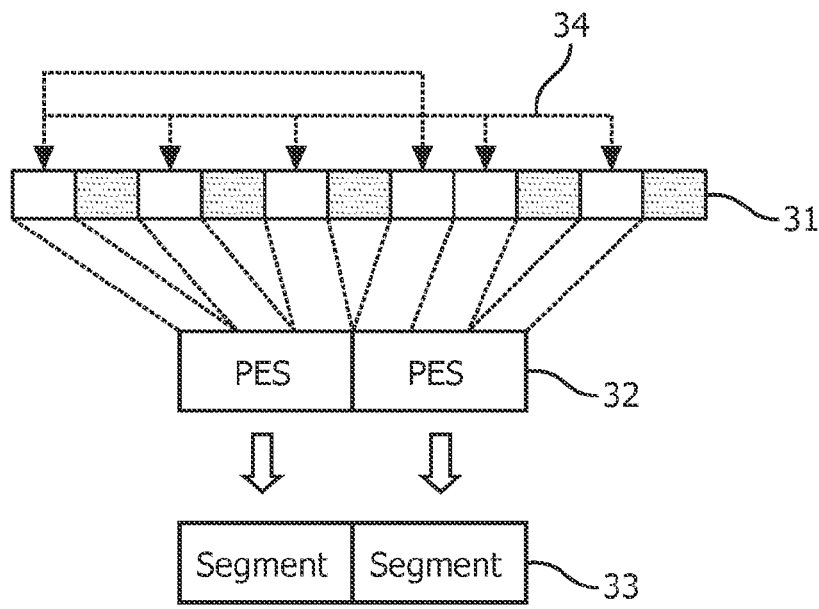
FIG. 3 shows a BD data stream with graphics.
FIG. 4 shows types of segments.

FIG. 3 shows a BD data stream with graphics. The Blu-ray Disc data stream comprises a transport stream 31 having transport packets 34. A subset of the packets 34 may have the same packet identifier PID and then forms a dedicated stream of elementary packets (PES), said PES Packets constituting a Graphics Elementary Stream 32. Segments 33 are data structures that are embedded in the stream of PES packets. Further information on the BD system can be found in US applications US2006580647 and US20090103895 and the BD-ROM A/V White Paper_100604(1)-15916 available from the Blu-ray Disc Association. The documents describe how streams are processed in a Blu-ray Disc player and how video is combined with synchronized graphics and audio data to create a compelling movie experience. In Blu-ray Disc the audio and graphics data may be embedded into the main transport stream or may be embedded into another auxiliary transport stream that contains data that may be presented in sync with the content of the main transport stream dependent on input from the user. For example a playlist may be defined with multiple subtitle streams for different languages. In Blu-ray Disc this means for example that a playlist is defined with multiple playitems, whereby each playitem may have multiple sub-playitems, these sub-playitems then would contain different subtitle streams from which the system can select dependent on user input.

Synchronization with the main video is done at elementary stream level using Presentation Time Stamp (PTS) values in the PES packets. The Blu-ray Disc graphics segment consists of a segment descriptor and the segment data. The segment descriptor contains the type of the segment and the length.

It is proposed to define a new segment type that carries information on how to process graphics when the video playback mode is set to HDR, for example as follows.

A Presentation Graphics or Interactive Graphics or Text subtitle stream on a HDR enabled disc additionally contains an HDR_Processing_definition segment. This segment defines the way the decoder processes Presentation Graphics or Text subtitle graphics in High Definition Movie (HDMV) mode and/or BD Java (BD-J) mode and Interactive Graphics (HDMV mode) in case of HDR Video. The HDR_Processing_definition segment may contain for every palette definition segment in the stream also a new HDR_palette definition. The composition buffers for the HDMV Presentation Graphics decoder, the HDMV Interactive Graphics decoder and the HDMV Text subtitle decoder in the BD graphics decoder model is extended to be able to store the palette data for both the LDR and the HDR presentation. When a menu is activated the graphics decoder model checks the display mode through a new register or newly defined (initially reserved) register bits that indicates the LDR/HDR playback mode. When the mode change from LDR to HDR is done the graphics decoder model processes the graphics as defined in HDR_Processing_definition segment. The graphics decoder model may ignore the standard palette definition and instead load the new HDR palette definition from the composition buffer into the CLUT (Color Lookup Table). When switching back to LDR mode the standard palette definition segment is loaded into the CLUT from the composition buffer and the HDR palette is ignored. Other algorithms for graphics processing may also be defined in the HDR_Processing_definition segment.

The advantage of this approach is that it provides a backward compatible solution as existing LDR players will ignore the new segment type. Additionally it saves disc capacity and bandwidth as it doesn't require duplicate graphics objects while the additional HDR_Processing_definition segment requires comparatively little data. Moreover, using the palettes allows for different processing for different types of graphics content.

In a further embodiment for pop-up menu's the video is automatically switched back to LDR mode when the user activates a BD-Java pop-up menu. At the moment the pop-up menu is switched off, the video is automatically switched back to HDR.

In a further embodiment a set of two different graphics streams is defined. One graphics stream is provided for LDR and the other one has at least substantially the same contents but is adapted for HDR. A HDR graphics indication may be provided in an attribute of the graphics stream. A linking mechanism between the LDR graphics stream and the corresponding HDR graphics stream may be provided to indicate which graphics stream is the HDR graphics stream corresponding to a particular LDR graphics stream, for example a pointer. The HDR version indication may be included in extension data of e.g. a PlayList file and may contain a link to the corresponding LDR version. Hence the reproducing device is enabled to select the respective one of both streams. In the embodiment the graphics processing control data may comprise a graphics selection instruction defining whether to retrieve a stream of HDR graphics data while the specific display mode is the HDR display mode, and the video processor is arranged for using the HDR graphics data while overlaying the video data when the specific display mode is the HDR display mode in dependence on the graphics selection instruction.

FIG. 4 shows types of segments. Various types of segment, such as Palette Definition Segment, Object Definition Segment, etc, are defined in the Blu-ray Disc standard, where value 0x83 to 0xFF are reserved. The table comprises a new segment type 41 with for example value 0x83 that indicates a segment that contains the HDR_Processing_definition segment. In general, the HDR_Processing definition segment contains parameters and/or instructions that affect the way the graphics decoder processes the graphics in HDR display mode. So in the event that the display mode is HDR the parameters and/or instructions modify the result of the regular processing.

FIG. 5 shows graphics processing control data. The table shows an example of how the structure of the HDR_Processing_definition segment may look like. In this example the HDR_Processing_definition segment contains two processing instructions: a Pop-up_process_descriptor 51 and a Subtitle_process descriptor 52. The segment may also contain HDR palettes 53 to be used when display mode is HDR. It is to be noted that the original palettes (now called LDR palettes) are provided in other segments as defined in the BD standard. In addition, the HDR palette contains the same number of entries as the original LDR palette but the entries are adapted to HDR display mode such that the Y, Cr and Cb values in the palette have the same color matrix as the associated HDR video stream.

The values of Y, Cr, Cb, and T are adapted to reduce the problems when combining graphics in HDR display mode.

FIG. 6 shows HDR graphics processing instructions for pop-up graphics. The instruction Pop-up_process_descriptor specifies the extra processing of the graphics in the case of pop-up graphics in combination with HDR video. As an example this parameter can have the following values:

Pop-up_process_descriptor=0x00 is an instruction which instructs that the graphics processing for HDR video is equal to processing for LDR video;

Pop-up_process_descriptor=0x01 to 0x09 are transparency instructions 61, which instruct that the transparency is to be reduced to a specific percentage of LDR transparency value;

Pop-up_process_descriptor=0x0A is a video switch instruction 62, and instructs the player to switch to LBR video when pop-up graphics is activated and to switch back to HDR when pop-up graphics is de-activated;

Pop-up_process_descriptor=0x0B2 is a HDR instruction 63 that instructs the graphics processor to use the HDR palettes.

For the transparency instructions it is noted that transparency only needs to be reduced if the original data was transparent. Reduction values in the table are just examples, practical values may be different, e.g. have fewer levels, a logarithmic scale etc.

For the video switch instruction, the following is noted. In HDMV mode, the player simply responds to the pre-defined PopUp On( ) and PopUp Off( ) User Operations and an optional preference setting in a to be defined field of a Player status register (PSR). The preference could be set through a value in the Playlist for the title and indicate that video should switch back to LDR when a pop-up menu is shown. If the preference is set to switch back to LDR, the player will automatically switch to LDR when the PopUp On( ) User Operation is activated, and switch back to HDR when the PopUp Off( ) is activated. In BD-J mode, the same kind of behavior can be achieved by having the BD-J program respond to VK_POPUP_MENU BD-J Events and appropriately control the video steam selection and playback.

FIG. 7 shows HDR graphics processing instructions for subtitle graphics (e.g. Presentation Graphics or Text subtitles). The instruction Subtitle_process_descriptor specifies the extra processing of the graphics in the case of subtitle graphics in combination with HDR video. As an example this parameter can have the following values:

Subtitle_process_descriptor=0x00 is an instruction which instructs that the graphics processing in HDR video is equal to the LDR mode;

Subtitle_process_descriptor=0x01 to 0x09 are luminance instructions 71, which instruct that the luma value is to be reduced to a specific percentage of LDR luma value (the luma value is representing the luminance, usually denoted as Y);

Subtitle_process_descriptor=0x0A is a HDR instruction that instructs the graphics processor to use the HDR palettes.

Additionally the HDR graphics processing instructions for pop-up graphics and/or for subtitle graphics may further include the graphics selection instruction as described above.

Additionally the HDR graphics processing instructions may further include instructions to change the position of the graphics and/or the video on the screen. Hence, the overlap of graphics and very bright areas of the video may be avoided by changing at least one of said positions. For example, in the letterbox format, the video can be moved up and the subtitles can be positioned in the black bar below the video.

It is noted that the display mode may be determined based on the capabilities of the display device coupled to the video processing device, e.g. via a HDMI signal. Also user settings in the display device for selecting the display mode (LDR or HDR) may be communicated to the processing device. HDMI provides for communication (such as EDID or Display Port) of display capabilities of the sink device to the source device, e.g. an indication of 1 bit defining that HDR is supported. A BD player may use this indication to set the Display Capability Register. Alternatively the user may set the display capability during a set up procedure. Finally it is noted that the user may also dynamically switch the display mode, i.e. the user selects a different display mode during playback based on changing preferences. The various options for controlling the display mode and the graphics processing are elucidated by the following Figures.

FIG. 8 shows HDR graphics processing instructions for an input stream of video information with only LDR video data. It is to be noted that the video may originally be LDR video, which is now displayed in HDR display mode. The video information is provided with HDR graphics processing instructions for controlling the graphics processing when the display mode is HDR. Actual instructions are similar to FIG. 6, but the switch instruction 62 is not present.

Figure 9:
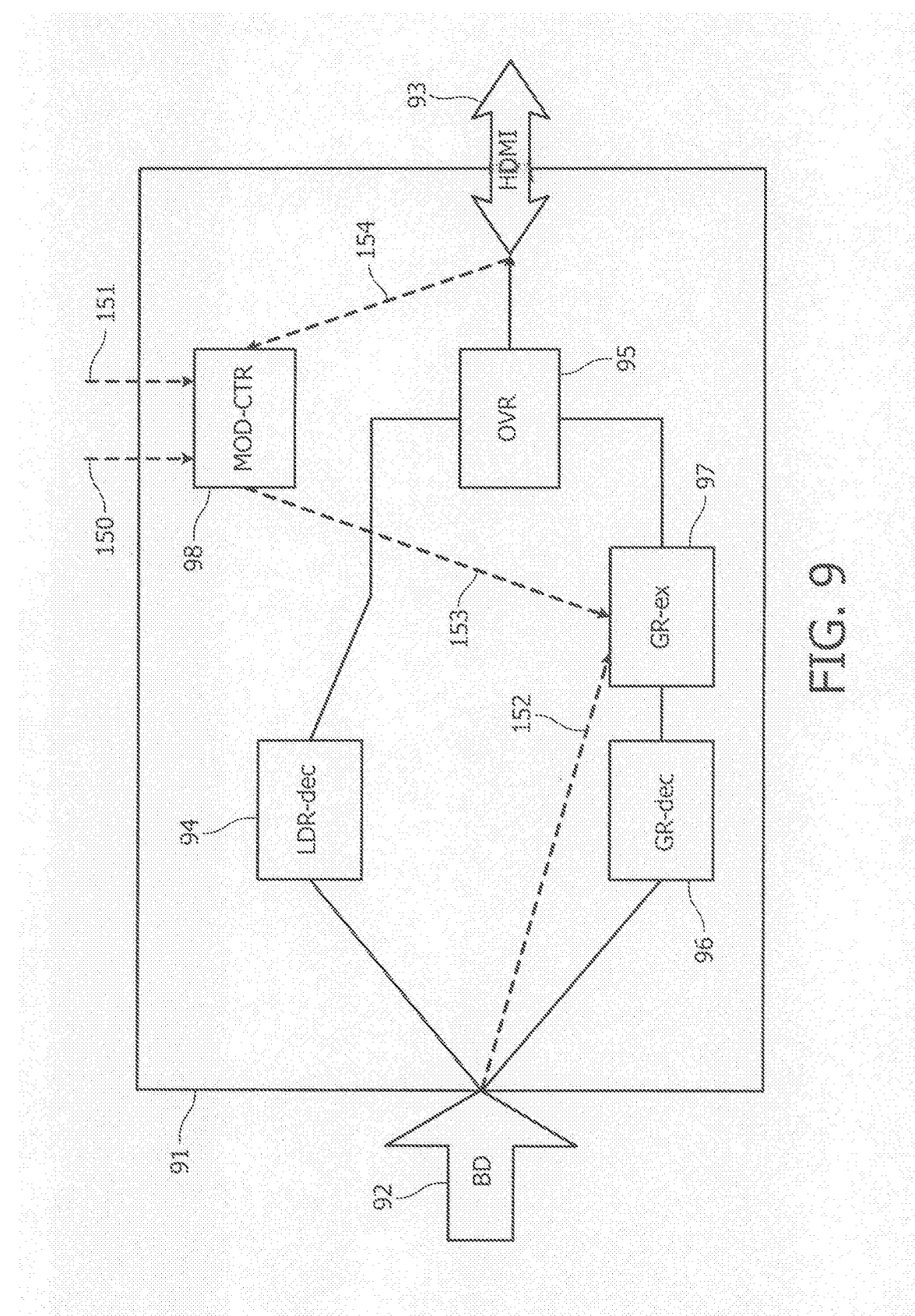
FIG. 9 shows video processing controlled via graphics processing control data and the display mode for an input stream of video information with only LDR video data.

FIG. 9 shows video processing controlled via graphics processing control data and the display mode for an input stream of video information with only LDR video data. A video processing system 91, e.g. a BD player, receives an input stream of video information, e.g. a BD data stream 92. LDR video data is processed in LDR video decoder LDR-dec 94. Graphics data is processed in graphics decoder GR-dec 96, and further additionally processed in extra graphics processor GR-ex 97. A mode controller MOD-CTR 98 may receive a display mode signal 154 indicative of the display mode set by the sink device coupled to the output of the video processing system. The mode controller may also receive user command, such as a user display mode setting 150 or a user temporary setting 151 for temporarily inverting the display mode. The mode controller may control a one bit setting in a register that indicates the actual display mode, e.g. in the player register of a BD player. The mode controller provides, to the extra graphics processor, mode data 153 indicative of the display mode being any one of a LDR display mode and a HDR display mode. The extra graphics processor also receives the graphics processing control data 152 including the HDR processing instructions as described above. The processed graphics data constitutes an overlay that is used in overlay processor OVR 95 to overlay the video to generate the display signal 93, e.g. a HDMI signal. In the embodiment graphics processing is dictated by the HDR instructions as defined by the HDR_Processing_definition segment, and the mode data 153 indicating whether the display mode is LDR or HDR.

Figure 10:
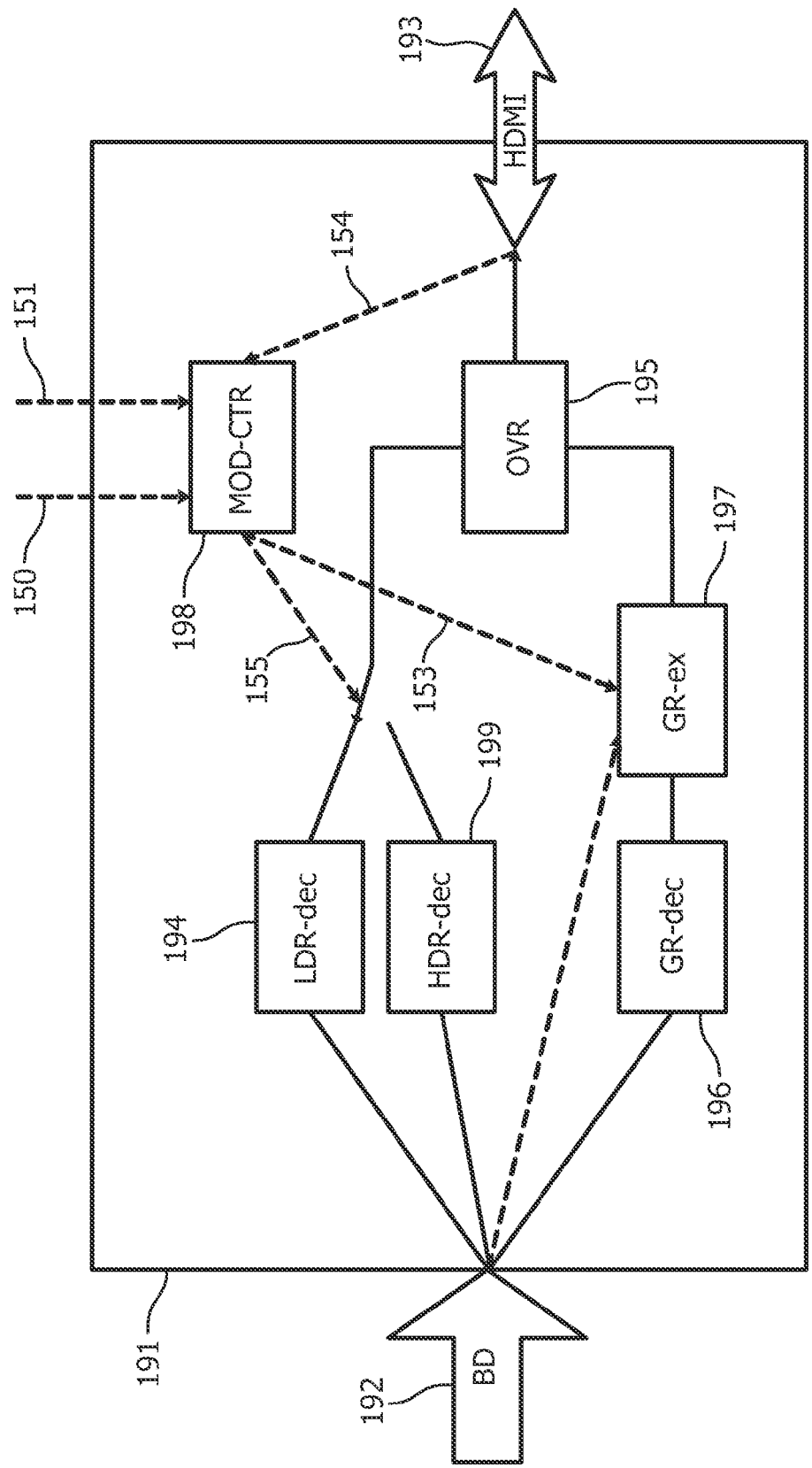
FIG. 10 shows video processing controlled via graphics processing control data and the display mode for an input stream of video information with LDR and HDR video data.

FIG. 10 shows video processing controlled via graphics processing control data and the display mode for an input stream of video information with LDR and HDR video data. The system has similar elements like in FIG. 9. A video processing system 191, e.g. a BD player, receives an input stream of video information, e.g. a BD data stream 192 having both LDR video data and HDR video data. A mode controller MOD-CTR 198 may receive a display mode signal 154 indicative of the display mode set by the sink device coupled to the output of the video processing system. The mode controller may also receive user command, such as a user display mode setting 150 or a user temporary setting 151 for temporarily inverting the display mode. The mode controller may control a one bit setting in a register that indicates the actual display mode, e.g. in the player register of a BD player. The mode controller provides, to the extra graphics processor, mode data 153 indicative of the display mode being any one of a LDR display mode and a HDR display mode. The mode controller also controls selection of either a LDR decoder 194 or a HDR decoder 199 for decoding the respective LDR video data stream or HDR video data stream via a video stream selection signal 155. Graphics data is processed in graphics decoder GR-dec 196, and further additionally processed in extra graphics processor GR-ex 197. The extra graphics processor also receives the graphics processing control data 152 including the HDR processing instructions as described above. The processed graphics data constitutes an overlay that is used in overlay processor OVR 195 to overlay the video to generate the display signal 193, e.g. a HDMI signal. In the embodiment, graphics processing is dictated by the HDR instructions as defined by the HDR_Processing_definition segment and the mode data 153 indicating whether the display mode is LDR or HDR, whereas the decoding of the video stream is selected correspondingly.

In an embodiment a processing system similar FIG. 10 to is provided with the extra graphics processing 197 and the mode controller 198, but is not provided with the HDR decoder 199, e.g. a low cost player. The system may be connected to a HDR display. The input stream may be a video data stream 192 having both LDR video data and HDR video data. The system will automatically select the LDR video data stream to be decoded via the LDR decoder, but will control the extra graphics processing 197 in dependence of the display mode as determined by the mode controller.

According to a different aspect of the invention, the video signal is for transferring video information to the video processing device, the video information comprising low dynamic range [LDR] video data and/or high dynamic range [HDR] video data, and the video signal comprising both LDR graphics data and HDR graphics data comprised in the video information. Both streams of graphics data may be fully independently encoded, or may share some elements. Having two separate streams of graphics data, respectively for the LDR display mode and the HDR display mode, advantageously enables the source of the video to fully control the graphics functions for both display modes separately. Optionally, a HDR indication is included in an attribute of the graphics stream and a linking mechanism between the LDR graphics stream and the corresponding HDR graphics stream is provided.

It is noted that, traditionally, brightness and contrast during display are only controlled at the reproducing side by the user. The inventors have seen that problems will occur if traditional graphics is displayed in HDR display mode under user control. While some of the problems might be mitigated by providing further user controls, e.g. a separate user transparency setting for HDR mode, the inventors have seen that this might confuse the user, and have proposed to add, at the source side, both the LDR graphics stream and the HDR graphics stream to the video signal. This contravenes traditions in the field of signal transfer systems, which try to limit the amount of data that needs to be transferred.

Optionally, either one, or all, of the pop-up graphics data, the subtitle graphics data, and other graphics data like interactive graphics applications, may be included in said two versions in the video signal. Also, separate versions may also be provided only for limited periods in the video signal, e.g. only when the source decides that the above problems actually occur. In periods having said two versions of graphics data the reproducing device will select either the LDR version or HDR version depending on the display mode. In other periods of the video signal the reproducing device will use the single graphics stream as provided. The periods having two versions may be marked by special graphics selection indicator data included in the video signal.

A video processing system similar to FIG. 10 has a graphics selection unit for selecting one of the LDR graphics stream and the HDR graphics stream depending on the specific display mode of the HDR display. The device for processing video information comprises an input unit for receiving the video information, the video information comprising LDR video data and/or HDR video data, and a video processor for generating a display signal by processing the video data for display in a specific display mode being any one of a LDR display mode and a HDR display mode, and for processing graphics data for generating an overlay for overlaying the video data. The video information comprises LDR graphics data and HDR graphics data. In the device the input unit is constituted for retrieving either the LDR graphics data or the HDR graphics data for the video information, and the video processor is constituted for selecting either the LDR graphics data or the HDR graphics data when overlaying the graphics data in dependence on the specific display mode.

Advantageously both LDR graphics data and HDR graphics data are provided in the video signal using an authoring system or in a method of generating video information for transferring to a video processing device, e.g. implemented in a computer program. Hence the author is enabled to fully control the graphics that will be displayed in the respective display mode. When both LDR video data and HDR video data are included in the video signal, the corresponding LDR or HDR graphics data may be used for generating the display signal at the reproducing side.

In a particular case, the video data may comprise only HDR video data but still have both the LDR graphics data and the HDR graphics data. While the video signal only contains a single video data stream, this still enables selecting the LDR graphics data when the HDR video data is reproduced for display on a traditional (LDR) display unit. The HDR graphics data will be selected for display in the HDR display mode.

Optionally, the video data may comprise only LDR video data but still have both the LDR graphics data and the HDR graphics data. The LDR graphics data will be selected for display in the LDR display mode. While the video signal only contains a single video data stream, this still enables to select the HDR graphics data when the LDR video data is reproduced for display on an enhanced HDR display unit.

It is to be noted that the invention may be implemented in hardware and/or software, using programmable components. Methods for generating video information or processing video information for implementing the invention have the steps corresponding to the functions defined for the system as described with reference to FIG. 1.

Although the invention has been mainly explained by embodiments using signal transfer via BD, the invention is also suitable for any distribution of video via a digital channel, e.g. DVB broadcast or the internet.

It will be appreciated that the above description for clarity has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:

1. A device for processing video information, the device comprising:
    an input configured to receive the video information, the video information comprising low dynamic range [LDR] video data and/or high dynamic range [HDR] video data, and
    a video processor configured to generate a display signal by processing the video data for display in a specific display mode, the specific display mode being indicated by mode data as one of a LDR display mode and a HDR display mode, and to process graphics data for generating an overlay for overlaying the video data, wherein
    the input is further configured to receive graphics processing control data comprised in the video information, the graphics processing control data including at least one HDR processing instruction for overlaying the graphics data in the HDR display mode, and
    the video processor is further configured to adapt the processing of the graphics data when overlaying the graphics data in dependence on the specific display mode as indicated by the mode data and the HDR processing instruction.

2. The device as claimed in claim 1, wherein the video information comprises segments defining parameters for generating the overlay, the segments having respective segment types, the segments comprising a HDR processing definition segment of a HDR processing definition type for constituting the graphics processing control data, and the video processor is configured to adapt the processing of the graphics data according to the HDR processing instruction from the HDR processing definition segment.

3. The device as claimed in claim 1, wherein the graphics data comprises LDR palette information defining at least one LDR color palette and HDR palette information defining at least one HDR color palette and the graphics processing control data comprises a palette selection instruction for selecting the HDR palette, and the video processor is configured to select the HDR color palette in the HDR display mode in dependence on the palette selection instruction.

4. The device as claimed in claim 1, wherein the graphics processing control data comprises:
    a transparency instruction defining a reduction of transparency with respect to the transparency in LDR display mode, and
    the video processor is configured to adapt transparency of the graphics data in the overlay in the HDR display mode in dependence on the transparency instruction.

5. The device as claimed in claim 1, wherein the graphics processing control data comprises:
    a video switch instruction defining whether to switch the processing of the video data to LDR display mode while the specific display mode is the HDR display mode, and
    the video processor is configured to switch the video data to LDR display mode while overlaying the video data when the specific display mode is the HDR display mode in dependence on the video switch instruction.

6. The device as claimed in claim 1, wherein the graphics processing control data comprises at least one of:
    a pop-up process descriptor defining a HDR processing instruction when overlaying pop-up graphic data in the HDR display mode;
    a subtitle process descriptor defining a HDR processing instruction when overlaying subtitle graphic data in the HDR display mode.

7. The device as claimed in claim 1, wherein the video processor is arranged for setting the specific display mode in dependence of the mode data, which comprises at least one of:
    display capability information acquired from a display device connected to receive the display signal;
    display mode information received from a display device connected to receive the display signal;
    dynamic range information included in the video information, indicative of a dynamic range of the video information;
    a display mode preference based on a user setting.

8. The device as claimed in claim 1, wherein the device comprises at least one of:
 a display configured to display the display signal in the specific display mode;
 an optical record carrier comprised in the input configured to retrieve the video information from an optical record carrier.

9. The device as claimed in claim 1, wherein the graphics processing control data comprises:
 a luminance instruction defining a reduction of luminance with respect to the luminance in LDR display mode, and
 the video processor is further configured to defined luminance of the graphics data in the overlay in the HDR display mode in dependence on the luminance instruction.

10. The device as claimed in claim 1, wherein the graphics processing control data comprises:
 a graphics selection instruction defining whether to retrieve a stream of HDR graphics data while the specific display mode is the HDR display mode, and
 the video processor is further configured to use the HDR graphics data while overlaying the video data when the specific display mode is the HDR display mode in dependence on the graphics selection instruction.

11. A device for generating video information, the device comprising:
 an output configured to transfer video information to a video processing device, the video information comprising at least one of low dynamic range [LDR] video data and high dynamic range [HDR] video data,
 a video processing device configured to generate display signal by processing the video data for display in a specific display mode, the specific display mode being indicated by mode data as one of a LDR display mode and a HDR display mode, and to process graphics data for generating an overlay for overlaying the video data,
 wherein the device further comprises a video processor configured to generate the video information including graphics processing control data, the graphics processing control data including at least one HDR processing instruction for overlaying the graphics data in the HDR display mode for, in the video processing device, adapting the processing of the graphic data when overlaying the graphics data in dependence on the specific display mode as indicated by the mode data and the HDR processing instruction.

12. A method of processing video information, the video information comprising at least one of low dynamic range [LDR] video data and high dynamic range [HDR] video data, the method comprising:
 processing the video data for display in a specific display mode, the specific display mode being indicated by mode data as one of a LDR display mode and a HDR display mode,
 processing graphics data for generating an overlay for overlaying the video data,
 receiving graphics processing control data comprised in the video information, the graphics processing control data including at least one HDR processing instruction for overlaying the graphics data in the HDR display mode, and
 adapting the processing when overlaying the graphics data in dependence on the specific display mode as indicated by the mode data and the HDR processing instruction.

13. A method of generating video information for transferring to a video processing device, the video information comprising at least one of low dynamic range [LDR] video data and high dynamic range [HDR] video data, the video processing device being configured to generate a display signal by processing the video data for display in a specific display mode, the specific display mode being indicated by mode data as one of a LDR display mode and a HDR display mode, and processing graphics data for generating an overlay for overlaying the video data,
 generating graphics processing control data, the graphics processing control data including at least one HDR processing instruction for overlaying the graphics data in the HDR display mode for, in the video processing device, adapting the processing of the graphic data when overlaying the graphics data in dependence on the specific display mode as indicated by the mode data and the HDR processing instruction, and
 including the graphics processing control data in the video information.

14. A non-transitory computer-readable medium having one or more executable instructions stored thereon, which when executed by a processor cause the processor to perform a method for processing video information, the video information comprising at least one of low dynamic range [LDR] video data and high dynamic range [HDR] video data, the method comprising:
 processing the video data for display in a specific display mode, the specific display mode being indicated by mode data as one of a LDR display mode and a HDR display mode, and
 processing graphics data for generating an overlay for overlaying the video data,
 receiving graphics processing control data comprised in the video information, the graphics processing control data including at least one HDR processing instruction for overlaying the graphics data in the HDR display mode, and
 adapting the processing of the graphic data when overlaying the graphics data in dependence on the specific display mode indicated by the mode data and the HDR processing instruction.

\* \* \* \* \*